UNITED STATES PATENT OFFICE.

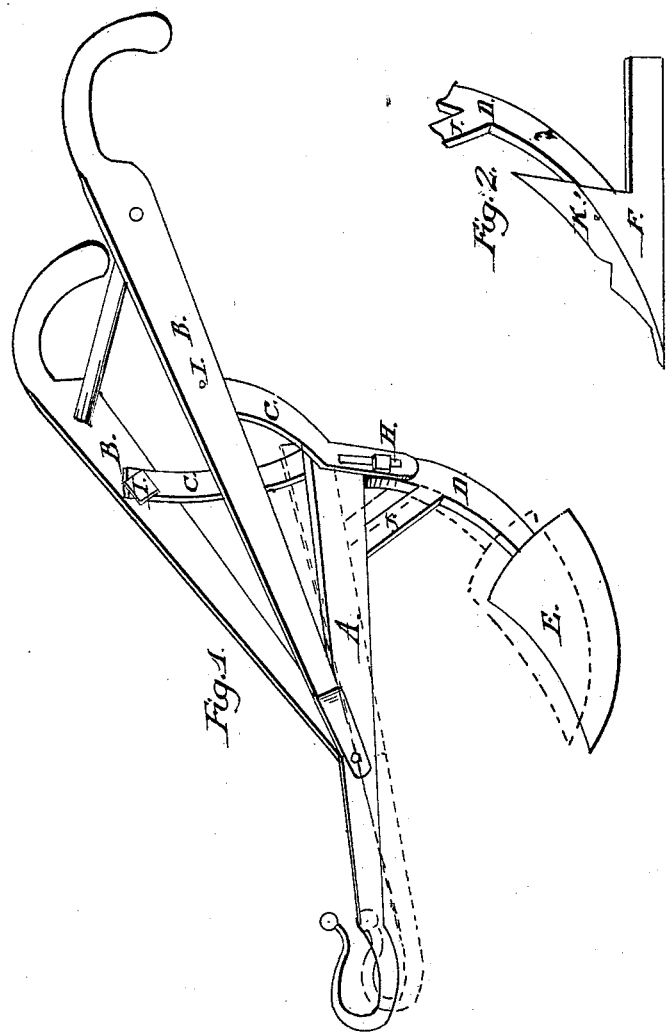

LEWIS GUTHRIE, OF WATERLOO, INDIANA.

IMPROVEMENT IN CORN-PLOWS.

Specification forming part of Letters Patent No. 94,489, dated September 7, 1869.

*To all whom it may concern:*

Be it known that I, LEWIS GUTHRIE, of Waterloo, Fayette county, Indiana, have invented certain new and useful Improvements in Corn-Plows; and I do hereby declare the following to be a full, clear, and exact description of the same, reference being had to the drawings which accompany this specification, forming a part of the same, and to the letters of reference marked thereon.

In the drawings, Figure 1 is a perspective view of my improved plow, with the ordinary shovel-mole attached. Fig. 2 is a perspective view of the ordinary mold-board plow, which may be substituted for the shovel-mole on the same sheth.

My invention relates to that class of corn-plows which are drawn by a single animal, and intended to make but one furrow at a single passage between the rows of corn or other growing crop for the cultivation of which it may be used.

The nature of my invention consists in providing the stock or framing of an ordinary shovel-plow with a sheth or standard so constructed that two or more moles or plows of different shape, and for different purposes may be attached or detached at the pleasure of the operator.

It further consists in providing the handles of the plow with curved standards, the upper ends of which are attached by screw-bolts to the handles, and their lower ends each provided with a longitudinal slot and fixed upon either side of the upper portion of the sheth, to which they are secured by a screw-bolt, allowing them to be moved up or down upon the same.

To enable those skilled in the art to make and use my said improvement, I will proceed to describe the same.

In Fig. 1, A is the beam, B B are the handles, D is the sheth or standard, and E is the shovel or mole. The brace J extends from the beam A to the sheth D, serving as a stay and support for the latter. The curved supports C C are placed in nearly a perpendicular position immediately over the rear end of the beam, and attached by screw-bolts at their upper ends to the handles. Their lower ends terminate in surfaces which are parallel to the perpendicular plane of the beam, and are provided with slots G, through which passes the screw-bolt H, which allows the handles to be elevated or depressed, and serves to secure them at any desired point to the sheth D. By this means the plow can be properly adjusted to the height required by the operator to enable him to manage the implement with the greatest ease and facility.

In Fig. 2 a different form of mole or plow is shown attached to the same form of sheth D, in which K represents the mold-board and F the landside-plate. This is to be substituted for the shovel-mole when it is desired to throw the soil either to or from the rows of the growing crop.

Having thus fully described my said invention, what I claim as new, and desire to secure by Letters Patent, is—

The curved supports C C, provided with slots G G, in combination with the handles B B, the beam A, the sheth D, and the brace J, when the said sheth D is so constructed as to carry and operate plows or moles of different forms of construction, substantially in the manner and for the purposes herein set forth.

LEWIS GUTHRIE.

Witnesses:
EDWIN CRAWLEY,
WM. T. DENNIS.